March 10, 1953 J. J. EBERLE 2,630,750
FEED AND CONTROL MECHANISM
Filed Feb. 2, 1946 3 Sheets-Sheet 2
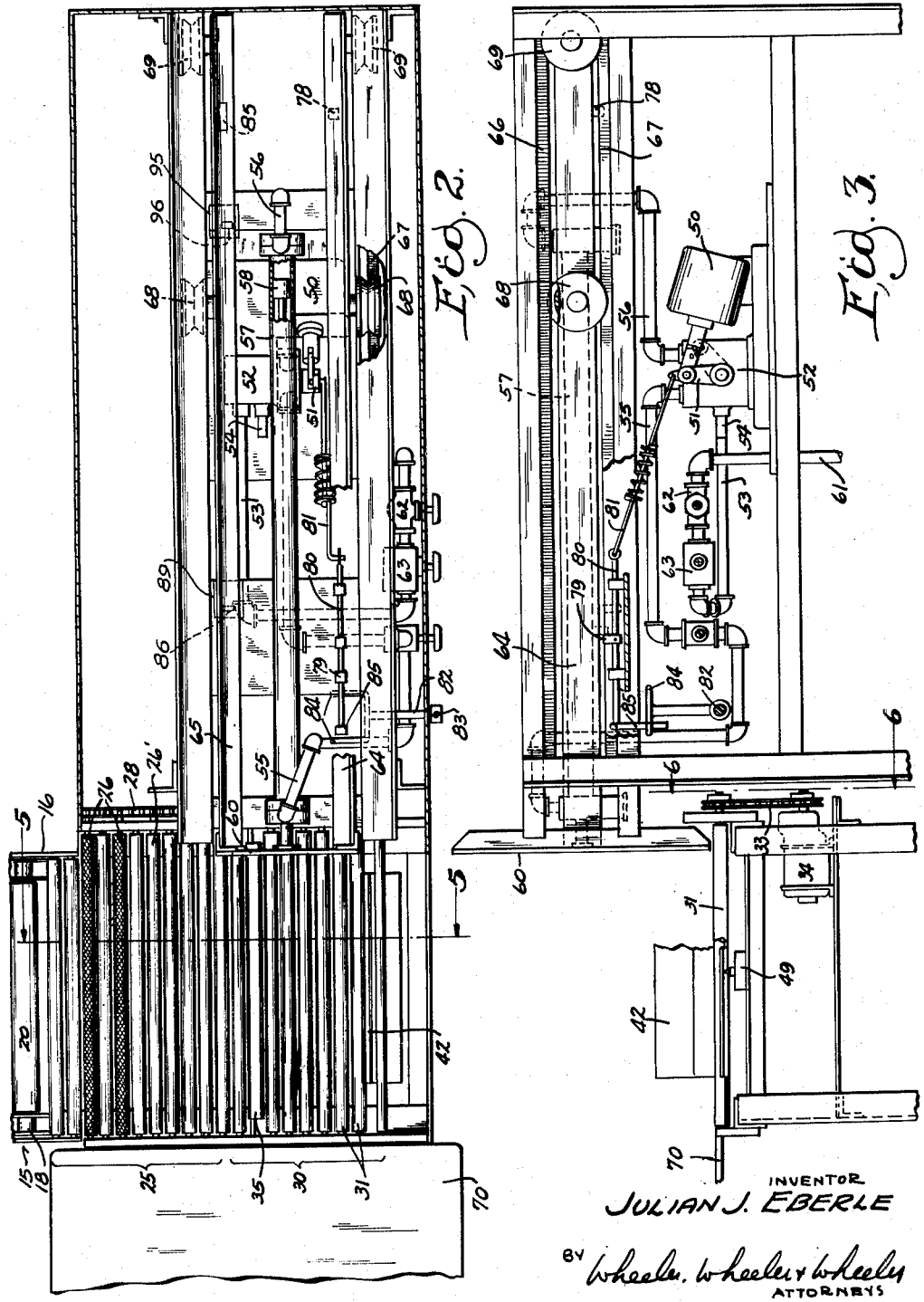
INVENTOR
JULIAN J. EBERLE
BY Wheeler, Wheeler & Wheeler
ATTORNEYS

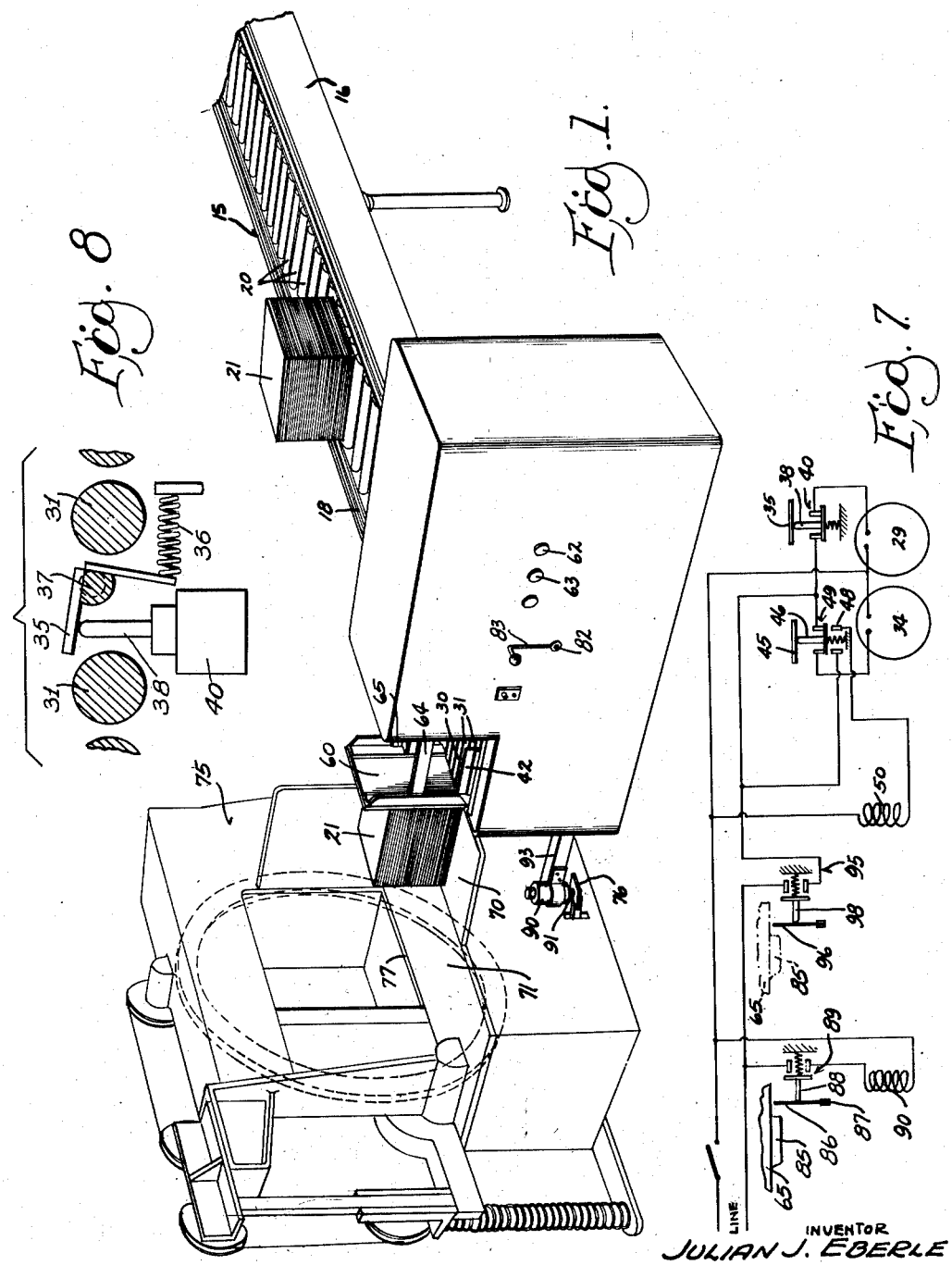

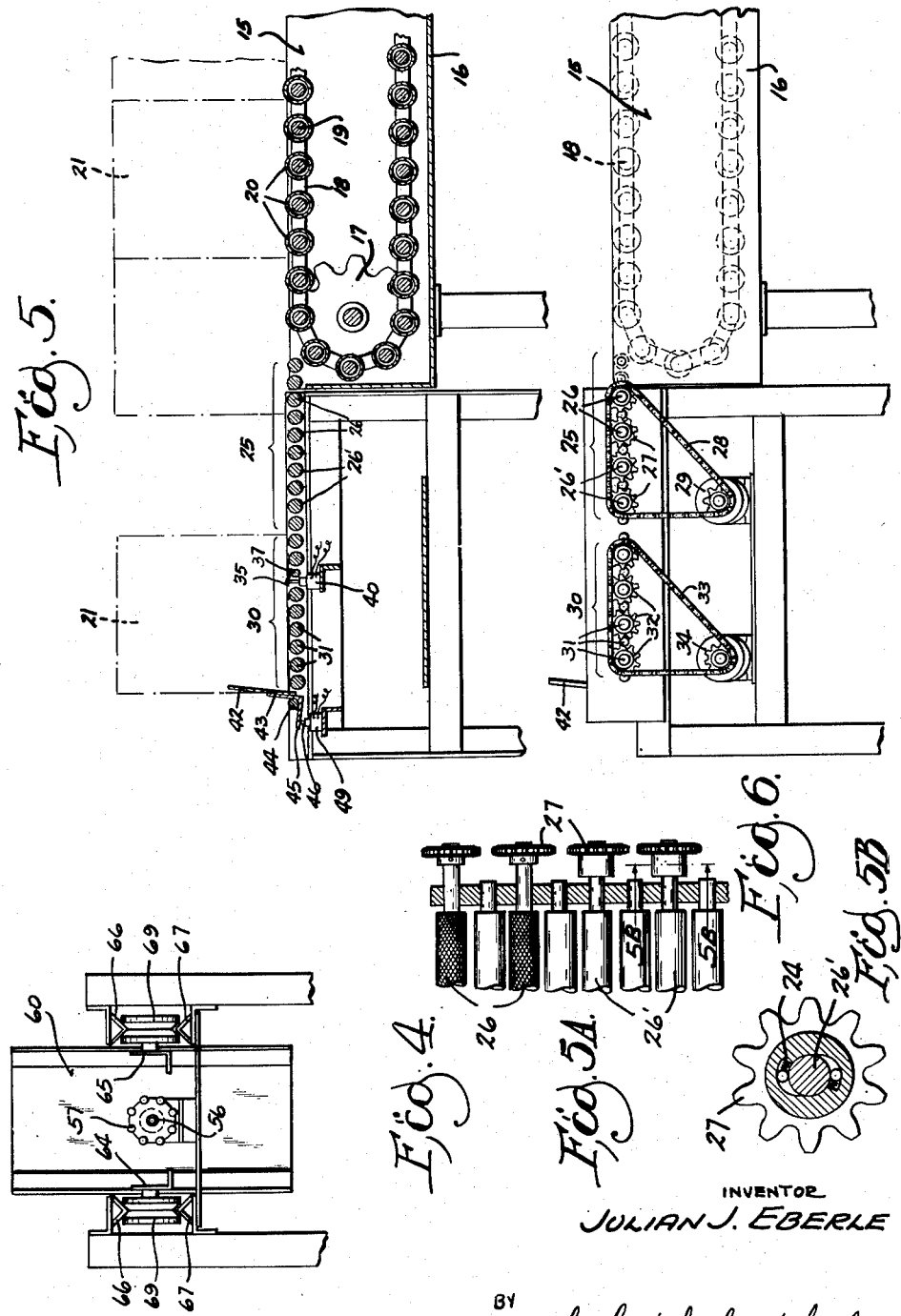

Patented Mar. 10, 1953

2,630,750

UNITED STATES PATENT OFFICE 2,630,750

FEED AND CONTROL MECHANISM

Julian J. Eberle, Wauwatosa, Wis., assignor to The Journal Company, Milwaukee, Wis., a corporation of Wisconsin Application February 2, 1946, Serial No. 645,190

16 Claims. (Cl. 100—4)

This invention relates to a feed and control mechanism. It has particular reference to making fully automatic the operation of a bundle tying machine or the like.

It is a primary object of the invention to provide for the automatic delivery of work to a tying machine or the like and the correlation of the conveyor feed with the operation of the machine in such a manner that all operations are effected automatically and mechanically. The bundle tying machine or the like may be of any conventional construction and may be some machine other than a bundle tying machine. No modification of the machine structure is required for the purposes hereof. The infeed conveyor, however, is especially designed in order to effectuate the controls contemplated by the invention.

More specifically stated, it is my purpose to provide a conveyor system which is so impositive in its action that work may accumulate thereon, awaiting its turn for delivery to the machine, while at the same time, providing for ultimate delivery of individual pieces of work to the machine with sufficiently positive action not only to assure the correct positioning of the work respecting the machine which is to operate thereon but also pushing from the machine work which has previously been acted on thereby. To effectuate these objectives involves a number of separate conveyor elements some of which are continuously operable and others of which are intermittently operable, and the operation of all of which must be coordinated with each other and with the operation of the machine.

Other objects of the invention will be more apparent in the light of the following disclosure thereof.

In the drawings:

Fig. 1 is a general view in perspective of a device embodying the invention as applied to a tying machine which is diagrammatically shown.

Fig. 2 is a view partially in plan and partially in section fragmentarily illustrating the conveyor system and controls.

Fig. 3 is a view in side elevation of the parts shown in Fig. 2.

Fig. 4 is a view in rear elevation showing ram mechanism with the casing removed.

Fig. 5 is a view taken in section on the line indicated at 5—5 in Fig. 2.

Fig. 5a is an enlarged detail view in plan of a conveyor section, the roller bearing supports being shown in section.

Fig. 5b is a detail view taken in section on the line 5b—5b in Fig. 5a.

Fig. 6 is a view taken in section on the line indicated at 6—6 in Fig. 3.

Fig. 7 is a wiring diagram simplified for the purposes of this disclosure.

Fig. 8 is a fragmentary detail view in side elevation diagrammatically illustrating the relation of a work-operated control to the switch actuated thereby.

The infeed conveyor 15 comprises a supporting channel or trough 16 which serves as a frame for sprockets 17 over which, at opposite sides of the channel, operate the chains 18. These chains are connected by the cross bolts 19 on which are mounted the freely rotatable rollers 20 which support the bundles or other work pieces 21. The conveyor shown is in continuous operation and is capable of advancing the work pieces 21 as long as there is no resistance to their advance. However, if the movement of any work piece 21 is arrested, the conveyor will freely continue to operate, the rollers 20 idling beneath the work piece without propulsion thereof. Yet when the obstruction is removed, the work pieces will resume their advance with the conveyor.

At the delivery end of this conveyor is a conveyor section 25 which comprises a number of small feed rolls 26, 26' between which there may be idler rolls. The feed rolls are preferably knurled as shown in Fig. 2 and Fig. 5a, and provided with sprockets 27 as shown in Fig. 6 to be operated by chain 28 from motor 29. The sprockets which drive feed rolls 26 are fast thereto while the rolls 26' are driven from their respective sprockets by overrunning clutches 24. The power operated rolls 26 of conveyor 25 are not in continuous operation as will hereinafter be explained.

Continuing beyond conveyor section 25 there is another conveyor section at 30 which is similar to section 25, having a number of small rolls 31, some of which are provided with sprockets 32 driven by chain 33 from motor 34 as shown in Fig. 6.

At a point to be engaged by a work piece leaving conveyor section 25, but in such a position that the work piece in question is within the influence of conveyor section 30, I provide means for controlling the motor 29. This means preferably includes a slightly raised control member 35 pivoted at 37 and yieldably supported by a spring 36. When the raised control 35 is struck by a work piece 21, it is readily depressed to actuate the contact button 38 of a switch 40 which normally closes the circuit of motor 29 but opens such circuit when depressed. Thus, the movement of a work piece 21 from conveyor section 25 on to conveyor section 30 causes the conveyor section 25 to cease operating for the time being. This will automatically arrest the advance of any additional work piece 21 arriving on the conveyor 15. If successive work pieces arrive on conveyor 15, they will be brought to rest on the conveyor upon contact with the most advanced work piece 21 thereon, as shown in Fig. 5. Thus the infeed conveyor 15 acts as a storage conveyor upon which any number of work pieces within its capacity may be accumulated and from which the most advanced work pieces will, from time to time, be discharged whenever the conveyor 25 operates. While some other conveyor arrangement subject to the control of member 35 may be used, the conveyor as shown is preferred.

At the time the work piece advancing over conveyor section 25 engages the control 35, the conveyor section 30 will also be in operation. When conveyor section 25 stops, the work piece will continue to move on conveyor section 30 until it encounters stop plate 42, delivery from section 25 being accommodated by the overrunning clutches 24 which permit rollers 26' to idle. The stop plate is mounted on a bell crank 43 pivoted at 44 and having an arm 45 positioned to engage the control button 46 of a double throw switch with spaced contacts 48 and 49. The two sets of contacts may be regarded as separate switches. Switch 49, normally closed, is in circuit with motor 34. Depression of the control button 46 opens the circuit of motor 34, thus bringing the driving rollers of conveyor section 30 immediately to rest. Switch 48 has normally open contacts which are closed when the button 46 is depressed to complete a circuit to the solenoid 50 which, as is best shown in Fig. 3, is connected to the control lever 51 of a valve 52.

The valve 52 has an inlet supply connection comprising pipe 53 and a discharge to atmosphere or elsewhere through pipe 54. It is the function of the valve to connect either the pressure supply pipe 53 or the discharge pipe 54 through pipes 55, 56 with the opposite ends of the ram cylinder 57 to actuate piston 58 and ram head 60. When the outer supply pipe 53 is connected through the casing at valve 52 by movement of lever 51 from the full line position to the dotted line position thereof as viewed in Fig. 3, the pressure communicated through pipe 56 to the rear end of ram cylinder 57 advances the piston 58 and ram head 60, the fluid ahead of the piston being expelled through pipe 55 and the discharge pipe 54. When the control lever 51 is upright in its full line position as viewed in Fig. 3, pressure is admitted to the front end of the cylinder thereby impelling piston 58 rearwardly to retract the ram head 60 and to expel the fluid at the rear end of cylinder 57 through pipe 56 and discharge pipe 54. The operating fluid will preferably be compressed air but may comprise a liquid under pressure. It is preferably supplied to the inlet pipe 53 by means of a pressure supply line 61 leading through a cut off valve 62 and a pressure regulating valve 63.

The ram head 60 is guided for reciprocation by generally parallel carriage frame members 64, 65 which may conveniently be made of angle iron and which require no connection to each other except through the head 60, being prevented from lateral displacement by the upper and lower track rails 66, 67 which are V-shaped and upon which operate the forward and rearward pulleys 68, 69, attached to the carriage frame members 64, 65 at each side of the apparatus. While the upper rail 66 lies within the groove of pulley 68 at each side of the apparatus, it does not contact such pulley, the clearance being illustrated in Fig. 3. Similarly, the rear pulleys 69 at each side of the apparatus bear on the top rail 66 out of contact with the bottom rail 67 due to the fact that the weight of the ram head 60 is unbalanced upon the wheels 68, causing a downward thrust upon wheels 68 and an upward thrust upon wheels 69.

Reference has been made to the fact that as the advanced bundle 21 contacts the plate 42, the resulting movement of the lever arm 45 closes the switch 48 and opens switch 49 to interrupt the rotation of the rolls 31 of conveyor 30 and to energize the solenoid 50 which admits fluid through pipe 56 to the ram cylinder 57 for the advance of the ram. This slides the work piece or bundle 21 from right to left as viewed in Fig. 1, whereby it is delivered axially over the rollers 31 on to the receiving table 70, 71, of the wrapping and tying machine generically designated by reference character 75.

As above noted, the invention contemplates that some operation other than wrapping and tying may be performed upon the work piece or bundle. The wrapping and tying machine illustrated represents the machine with which my invention is actually associated and is typical of other machines which may be similarly fed and controlled in accordance with this invention. No details of the wrapping machine are shown, but it may be of the general construction illustrated in the patent to Dunn, No. 2,206,299 of July 2, 1940. It has a single control at 76 in the form of a foot pedal which initiates a complete cycle of operations of the machine 75, following which the machine 75 comes to rest.

After the ram 60 has advanced the work piece or bundle 21 somewhat farther than the position indicated in Fig. 1, the work piece comes to rest at a selected station which, in this particular machine, happens to be across the slot 77 through which the tying wires are manipulated around the bundle. As the ram and its carriage approach the delivery position aforesaid, a finger 78 carried by one of the frame members 64 engages a lug 79 on a reciprocable rod 80 which is connected by a spring link 81 with the valve lever 51 for mechanically reversing the position thereof, so that the operating fluid is supplied through pipe 55 to the forward end of the ram cylinder for the retraction of piston 58 and ram head 60. For controlling the ram by hand, I may provide a control shaft 82 having an external handle 83 and internally provided with forked arms 84 between which is disposed the arm 85' which is fast to the end of rod 80. The control handle 83 can remain perfectly stationary without responding to the normal reciprocation of the rod 80 and yet is available for shifting the rod 80 manually when desired for adjusting the valve lever 51 between its two operative positions.

As the ram head 60 moves away from the bundle or work piece 21, leaving the latter at the work station across slot 77 of the tying machine, a cam 85 connected with some part of the ram carriage, as, for example, frame member 65, almost immediately encounters the actuator 86 which is a spring having a fixed mounting at 87. As the cam 85 moves outwardly toward the delivery position of the work, the spring readily flexes to the left as viewed in Fig. 7, but as the cam 85 returns toward the right, as viewed in Fig. 7, the spring is forced sharply into contact with the button 88 of switch 89, thereby closing the normally open circuit through such switch to energize a solenoid 90 of which the armature 91 is arranged, as shown in Fig. 1, to actuate the foot pedal 76 which controls the single cycle operation of the machine 75. The solenoid may be mounted on a bracket and supported by an arm 93 from the casing of the conveyor apparatus. It is, however, broadly immaterial how the solenoid is mounted, the only purpose of supporting it from the conveyor housing being to avoid any connection whatever to the machine 75. If the mechanical mounting of these parts on the frame of machine 75 is permissible, they may be so mounted.

It is also broadly immaterial whether the ram be advanced in one step or two, it being within the contemplation of this invention that any desired dwell may be provided for by delayed action relays or otherwise where, for example, two ties must be made. The disclosed device will suffice to demonstrate that in any case fully automatic operation is preferred both as to the conveyor and the controlled tying machine.

That portion of the circuit which supplies current to motors 29 and 34 for the operation of conveyor sections 25 and 30 as previously described is controlled by the normally open contacts of switch 95. This keeps any additional bundles or work pieces 21 from being fed forwardly into the path of the ram at any time while the ram is substantially advanced from its most retracted position. As the ram approaches its most retracted position but is, in practice, about ten inches out, the cam 85 reaches the position shown in dotted lines in Fig. 7 to engage the actuator spring 96 and to flex such spring to a position where it engages the button 98 of switch 95 to close the circuit through such switch and thereby to leave the motors 29 and 34 subject to the control of switches 40 and 49 as previously described. The same circuit incidentally controls switch 48 and solenoid 50, although this is not essential.

Thus, just before the ram reaches its fully retracted position, switch 95 is closed. Switch 40 being already closed, the closing of switch 95 is immediately followed by the operation of the conveyor section 25 to advance another bundle or work piece 21. This starts into motion, to save time, while the ram is still moving to its cushioned seat in the end of the cylinder in which it is retracted. A repetition of the cycle of conveyor operation as above described moves the next bundle or work piece in front of the ram for advance into the machine 75.

The conveyors 25 and 30 are preferably operated much faster (about 50% faster, in practice) than conveyor 15 to separate the advanced bundle from those which are bunched behind it on conveyor 15.

The result is that the entire mechanism becomes automatically controlled and the services of one or more operators are eliminated. The retraction of the ram is a prerequisite to the feeding of an additional bundle or work piece into the path of the ram. The advance of the ram is prerequisite to the operation of the machine 75. The bundles or work pieces are stored on conveyor 15 and advanced as rapidly as they can be handled by the machine 75, all without the services or control of an operator. At the same time, the ram provides enough power so that as each successive bundle or work piece 21 is advanced into the machine 75, a completed or tied bundle or work piece is expelled from machine 75 by the thrust of the new bundle or work piece arriving into the machine.

Motors for operating the device disclosed are merely illustrative of separate power sources such as might have been represented by clutches for actuating the separate conveyors from one power operated shaft subject to the controls shown. A number of changes are possible while still placing the machine 75 subject to the control of the conveyor organization so that the whole operation is automatic.

I claim:

1. The combination with a machine having a control for initiating a predetermined cycle of machine movements, of a conveyor system including a first conveyor for bringing work pieces toward the machine, and a second conveyor comprising automatically operable propelling means for advancing individual work pieces into said machine, a control actuated by the movement of the individual work pieces on said first conveyor to a position in front of said propelling means and by which said propelling means is automatically operated, mechanism for actuating the control of said machine to initiate its cycle of movement upon delivery of a work piece thereto, a part connected for movement with said propelling means, and a control part in the path of said first part and connected to said mechanism to transmit movement thereto from the propelling means.

2. The combination with a machine having a control for initiating a predetermined cycle of machine movements, of a conveyor system including propelling means for advancing individual work pieces into said machine, mechanism synchronized with said propelling means for actuating the control of said machine to initiate its cycle of movement upon delivery of a work piece thereto, conveyor means for advancing individual work pieces into operative position respecting said propelling means, and mechanism synchronized with the operation of said propelling means for arresting the operation of said conveyor means when said propelling means is operative and for initiating the operation of said conveyor means when said propelling means is inoperative.

3. The combination with a continuously operable work impelling and storage conveyor comprising an endless conveyor means having a work supporting surface made up of freely rotatable rollers, of a first conveyor section intermittently operable and arranged at the end of the conveyor means aforesaid and adapted when operating to receive work from said conveyor means and when inoperative to reject work therefrom, a second conveyor section in advance of the first conveyor section and likewise intermittently operable, control means in the path of work advancing on to the second conveyor section for interrupting the operation of the first conveyor section while allowing work to be drawn therefrom by the second conveyor section, a second control means in the path of work advancing in the second conveyor section for interrupting the advance of such work after such work has cleared the first conveyor section, ram means for discharging work from the second conveyor section substantially at right angles to the direction of its advance thereon, and control means for the first conveyor section having an actuator connected with said ram means and adapted to render said first conveyor section inoperative when said ram means is advanced and to permit operation of said first conveyor section when said ram means is retracted.

4. In a conveyor system of the character described, the combination with a first conveyor section having power driven means for the operation thereof, of a second conveyor section arranged to receive work from the first conveyor section and having power driven means for its operation, a first motion-interrupting control for the first conveyor section disposed in the path of work advance on the second conveyor section for inactivating the first conveyor when work is on the second conveyor, a second control for the first conveyor section adapted independently of the first control to inactivate the first conveyor section, and normally retracted means for discharging work from the second conveyor section and comprising a member positioned for operative engagement with said second control for operating said second control for activating the first conveyor section when said work discharging means is retracted and for inactivating the first conveyor section whenever said work discharging means is operative, whereby the first conveyor is maintained inactive while the work discharging means advances work beyond the point of contact of the work with said first control, and during movement of the work discharging means toward its retracted position.

5. Means for operating as rapidly as work pieces can be handled thereby a machine having a control for initiating its cycle of operations, such means comprising in combination an infeed conveyor, a delivery conveyor for delivering work to the machine, an actuator for the said control of said machine, means regulating the movement of work from the infeed conveyor to the delivery conveyor, and mechanism for synchronizing the operation of said machine and said conveyors including means in the path of movement of said delivery conveyor for determining, in accordance with the movement of such conveyor, the operation of the machine control actuator and the means which regulates movement from the infeed conveyor to the delivery conveyor.

6. A device for automatically operating and feeding a machine having a single control for initiating its cycle of movement, said device comprising an actuator for said control, an infeed conveyor, a ram conveyor for delivering work pieces to said machine and provided with means for actuating it forth and back, a transfer conveyor comprising at least one section and comprising means for controlling the delivery of work pieces from the infeed conveyor to the ram conveyor, means operable upon the initial movement of the ram conveyor to preclude further delivery of work pieces from the infeed conveyor, means operable by a work piece delivered from the infeed conveyor to initiate the forth movement of the ram conveyor, and means operable by the ram conveyor for initiating its back movement and, in the course of such movement, for energizing said actuator and ultimately operating said controlling means for releasing another work piece for advance in front of the ram conveyor.

7. A device for automatically feeding and controlling the operation of a machine having a control for initiating a cycle of operation, said device comprising a ram conveyor movable to and from the machine for positively delivering a work piece thereto, conveyor mechanism operating substantially at right angles to the ram conveyor and adapted to deliver individual work pieces into the path of advance of the ram conveyor, control means in the path of work piece movement for initiating the advance of the ram conveyor and retarding the delivery of further work pieces toward the path of ram conveyor movement, and means in the path of ram conveyor operation actuated thereby for operating the control of said machine and for returning the ram conveyor and releasing another work piece for advance to a position in front of such ram conveyor.

8. A device for feeding and automatically controlling the operation of a machine having a control for initiating a cycle of machine movement, said device comprising a positively acting conveyor for delivering work pieces successively to the machine, feeding conveyor means operable substantially at right angles to the direction of operation of said positively acting conveyor, means regulating the operation of said feeder conveyor means for delivering work pieces individually to the positively acting conveyor for delivery to the machine, means for interrupting the delivery of further work pieces pending the completion of a cycle movement of the positively acting conveyor and for actuating such last mentioned conveyor, and means operable in the course of movement of the positively actuating conveyor for automatically actuating the control of said machine.

9. A device for automatically feeding and controlling the operation of a machine having a control for initiating its cycle of movement, said device comprising conveyor means substantially at right angles and including a first and impositive conveyor for storage and feed, second and third conveyor sections adapted to receive work pieces from the first impositive conveyor and intermittently operable, and a fourth and positive conveyor for delivering successive work pieces to said machine, said fourth conveyor having a control positioned to be acted upon by a work piece for initiating its cycle of movement and said second and third conveyor sections having controls synchronized to the movement of said fourth conveyor, together with an actuator for the control of said machine and synchronized to the movement of said fourth conveyor.

10. In combination, a continuously operable conveyor having a work supporting surface comprising freely rotatable rollers, a second conveyor comprising supporting rollers, some of which are rotatable by power, a motor for operating the power operated rollers, a third conveyor comprising rollers some of which are operable by power, a motor operatively connected to drive power operated rollers of the third conveyor, a ram movable across the third conveyor in a direction substantially axially of the rollers thereof, means in the path of work entering the third conveyor for interrupting the operation of the motor controlling the power driven rollers of the second conveyor, means in the path of work pieces on the third conveyor for interrupting the operation of the third conveyor and initiating operation of said ram, means for actuating said ram upon initiation of operation thereof, means for returning said ram upon the completion of its actuation, and means effective upon the return of said ram for reactuating the motors driving the second and third conveyor rollers.

11. The device set forth in claim 10 in further combination with means for actuating a control of a machine to which work pieces are delivered by said ram, said means including a member positioned in the path of said ram to be operated thereby for determining the point at which said control actuator will function.

12. The combination with a first conveyor section comprising rollers and a motor operatively connected to certain of said rollers for the power operation thereof, of a second conveyor section constituting a continuation of the first conveyor section and likewise comprising rollers and a second motor operatively connected to drive a certain section thereof, means for delivering work pieces to the first delivery section for advance thereby to the second conveyor section, means in the path of work pieces arriving at the second conveyor section for interrupting the operation of the motor of the first conveyor section, a ram movable across the second conveyor section longitudinally of the rollers thereof, means for actuating said ram and a control for said actuating means disposed in the path of work pieces on the second conveyor section and adapted to be actuated thereby to initiate ram movement.

13. The device of claim 12 in further combination with means for actuating a control of a machine to which work pieces are delivered by said ram, and means in the path of said ram for operating said control actuating means in accordance with ram movement.

14. The combination with a machine having a control for initiating a predetermined cycle of machine movements, of a conveyor system for advancing work pieces to said machine and including a work advancing means and a work delivery means arranged for work piece delivery into said machine, a control positioned for actuation by work piece advance to said said work delivery means and by which said work delivery means is intermittently operable, said machine control comprising a part disposed adjacent the path of movement of said work delivery means and adapted to receive movement therefrom for the actuation of said control in synchronism with the movement of said work delivery means.

15. The device of claim 14 in which said work delivery means is provided with control mechanism including a motion arresting control, and motion transmitting connections for the actuation of said last mentioned control substantially concurrently with the operation of said machine control, whereby the machine control is operated to initiate a cycle of machine movements substantially at the point of maximum advance of a work piece by said work delivery means.

16. The device of claim 15 in which the machine is a bundle tying machine.

JULIAN J. EBERLE.

REFERENCES CITED

The following references are of record in the file of this patent:

UNITED STATES PATENTS

| Number | Name | Date |
|---|---|---|
| 1,324,239 | Evans | Dec. 9, 1919 |
| 1,498,550 | Johnston | June 24, 1924 |
| 1,689,428 | Farmer | Oct. 30, 1928 |
| 1,958,138 | Fowler et al. | May 8, 1934 |
| 2,011,536 | Cave | Aug. 13, 1935 |
| 2,059,440 | Connolly et al. | Nov. 3, 1936 |
| 2,130,323 | Lueckel | Sept. 13, 1938 |
| 2,151,401 | Belcher | Mar. 21, 1939 |
| 2,176,940 | Young | Oct. 24, 1939 |
| 2,342,471 | Jampol | Feb. 22, 1944 |
| 2,470,795 | Socke | May 24, 1949 |